US011092175B1

(12) United States Patent
Blanding et al.

(10) Patent No.: US 11,092,175 B1
(45) Date of Patent: Aug. 17, 2021

(54) DUAL-INDEPENDENT HYBRID ACTUATOR SYSTEM

(71) Applicant: The Boeing Company, Chicago, IL (US)

(72) Inventors: David E. Blanding, Anderson, SC (US); Jeffrey C. Coffman, Huntington Beach, CA (US); Jimmy M. Quiambao, Walnut, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/827,385

(22) Filed: Mar. 23, 2020

(51) Int. Cl.
*F15B 21/08* (2006.01)
*F15B 15/14* (2006.01)

(52) U.S. Cl.
CPC .......... *F15B 21/08* (2013.01); *F15B 15/1457* (2013.01)

(58) Field of Classification Search
CPC .... F15B 21/08; F15B 15/1457; F15B 15/088; F15B 2015/206; B64C 13/341; B64C 13/505; B64C 13/42
See application file for complete search history.

(56) References Cited

U.S. PATENT DOCUMENTS

| | | | | |
|---|---|---|---|---|
| 4,932,311 A * | 6/1990 | Mibu | .................. | F15B 15/2823 91/361 |
| 6,755,375 B2 * | 6/2004 | Trikha | .................. | B64C 13/505 244/99.4 |
| 7,397,209 B2 * | 7/2008 | Hirai | .................. | B64C 13/42 318/280 |
| 8,474,339 B2 * | 7/2013 | Hirai | .................. | B64C 25/24 74/89.39 |
| 9,618,102 B2 * | 4/2017 | Hirai | .................. | F15B 9/12 |
| 9,790,969 B2 * | 10/2017 | Fenn | .................. | F16H 25/20 |
| 10,088,006 B2 * | 10/2018 | Fox | .................. | F15B 15/14 |
| 10,190,608 B2 * | 1/2019 | Wildman | .................. | F15B 15/088 |
| 10,458,442 B2 * | 10/2019 | Fenn | .................. | F15B 15/19 |
| 10,683,880 B2 * | 6/2020 | Fenn | .................. | F15B 15/14 |
| 2015/0204401 A1 | 7/2015 | Sakai et al. | | |

OTHER PUBLICATIONS

Qi H. et al., "Investigation in Hybrid Actuation for Duplex Actuators Operating in Active/No-load Modes," Proceedings of IEEE/ASME International Conference on Advanced Intelligent Mechatronics, Singapore, Jul. 14, 2009, 5 pages.

* cited by examiner

*Primary Examiner* — Thomas E Lazo
(74) *Attorney, Agent, or Firm* — Alleman Hall Creasman & Tuttle LLP

(57) ABSTRACT

A dual-independent hybrid actuator system includes an actuator body defining a hydraulic chamber. The actuator system includes a hydraulic piston assembly, including a hydraulic piston disposed within the hydraulic chamber and dividing the hydraulic chamber into a first hydraulic sub-chamber in fluid communication with a first hydraulic fluid passage and a second hydraulic sub-chamber in fluid communication with a second hydraulic fluid passage. The actuator system further includes a piston rod mounted to the hydraulic piston that passes through the second hydraulic sub-chamber with a distal end that projects outward from the actuator body. The actuator system further includes an electric motor mounted to the actuator body, and a threaded axle mechanically coupled to a motor shaft of the electric motor. The threaded axle passes through the first hydraulic sub-chamber and engages with a threaded port formed in the hydraulic piston assembly.

20 Claims, 6 Drawing Sheets

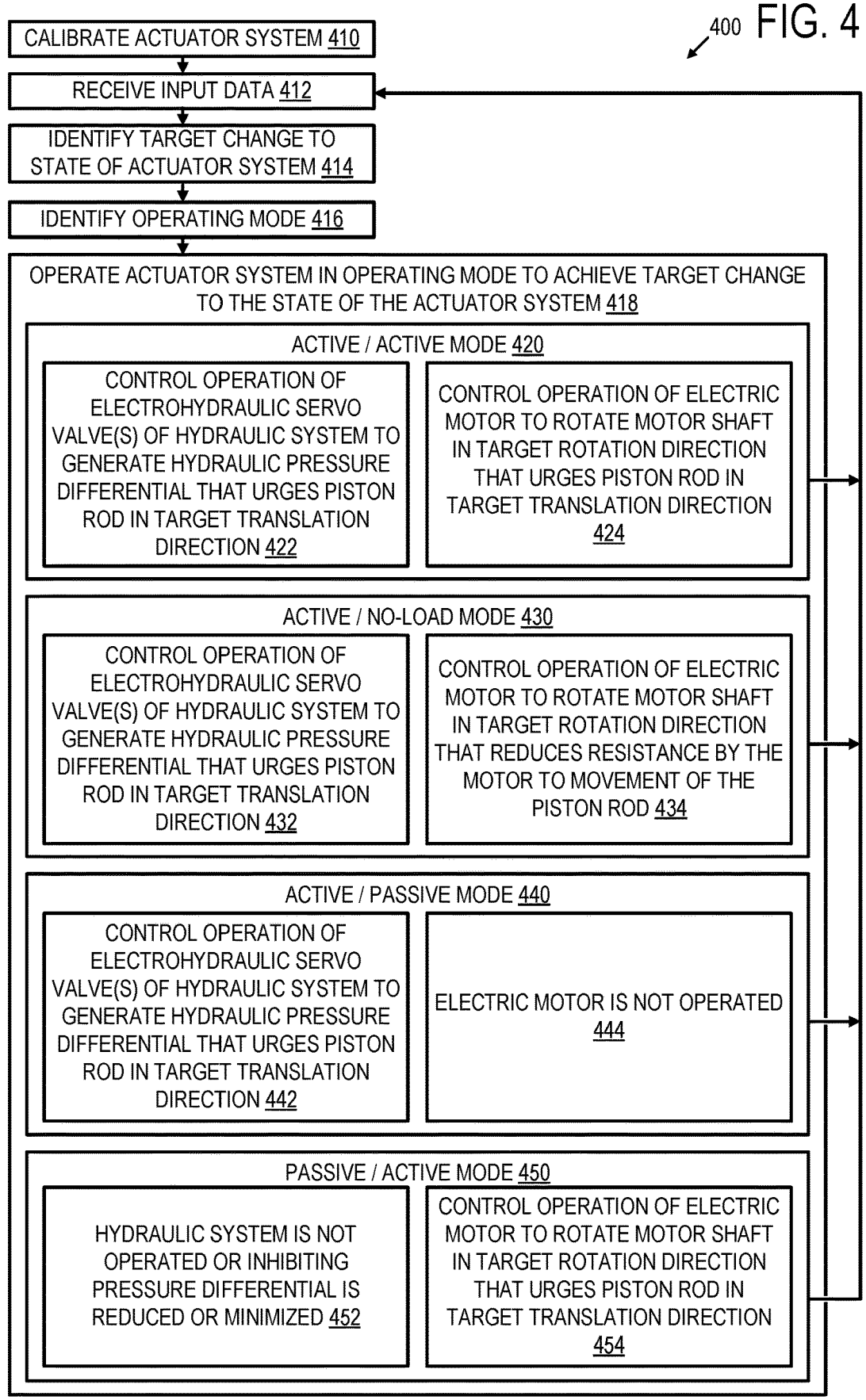

DUAL-INDEPENDENT HYBRID ACTUATOR SYSTEM

FIELD

An invention of the present disclosure relates generally to an actuator that is independently operable by a hydraulic system and by an electric motor.

BACKGROUND

Aircraft utilize flight control surfaces such as flaps and rudders that are manipulated by actuators to change orientation and/or position of the flight control surfaces relative to the airframe. Hydraulic actuators commonly used in commercial aircraft are controlled by an electrohydraulic servo valve of a hydraulic system that is in communication with the hydraulic actuator. Other types of mechanical systems beyond aircraft also utilize hydraulic actuators to manipulate mechanical components. In some cases, a backup system may be used in conjunction with a hydraulic actuator to enable flight control surfaces or other mechanical components to be manipulated by the backup system in the event that the hydraulic system is unable to provide sufficient control.

SUMMARY

According to an example of the present disclosure, a dual-independent hybrid actuator system includes an actuator body defining a hydraulic chamber within an interior of the actuator body. The actuator body further defines a first hydraulic fluid passage and a second hydraulic fluid passage in fluid communication with the hydraulic chamber. The actuator system includes a hydraulic piston assembly, including a hydraulic piston disposed within the hydraulic chamber and dividing the hydraulic chamber into a first hydraulic sub-chamber in fluid communication with the first hydraulic fluid passage and a second hydraulic sub-chamber in fluid communication with the second hydraulic fluid passage. The actuator system further includes a piston rod mounted to the hydraulic piston that passes through the second hydraulic sub-chamber with a distal end that projects outward from the actuator body. The actuator system further includes an electric motor mounted to the actuator body, and a threaded axle mechanically coupled to a motor shaft of the electric motor. The threaded axle passes through the first hydraulic sub-chamber and engages with a threaded port formed in the hydraulic piston assembly.

According to another example of the present disclosure, a method of controlling a dual-independent hybrid actuator system includes controlling operation of an electrohydraulic servo valve of a hydraulic system to generate a first hydraulic pressure differential between opposing sides of a hydraulic piston that urges a piston rod mounted to the hydraulic piston to move in a first translation direction. The method further includes, during movement of the piston rod in the first translation direction, controlling operation of an electric motor having a motor shaft mechanically coupled to the hydraulic piston via a threaded axle. Controlling operation of the electric motor includes providing electrical power to the electric motor to rotate the motor shaft in a first rotation direction that urges the piston rod to move in the first translation direction in coordination with a force imparted by the first hydraulic pressure differential, or reduces resistance by the motor to movement of the piston rod in the first translation direction.

According to another example of the present disclosure, a method of controlling a dual-independent hybrid actuator system includes, during a first control operation, controlling operation of an electrohydraulic servo valve of a hydraulic system to generate a first hydraulic pressure differential between opposing sides of a hydraulic piston that urges a piston rod mounted to the hydraulic piston to move in a first translation direction; and during a second control operation, controlling operation of an electric motor having a motor shaft mechanically coupled to the hydraulic piston via a threaded axle to rotate the motor shaft in a first rotation direction that urges the piston rod to move in the first translation direction.

The features and techniques discussed in this summary can be provided independently in various examples or may be combined in yet other examples, further details of which are described with reference to the following description and drawings.

BRIEF DESCRIPTION OF THE DRAWINGS

FIG. 4 is a flow diagram that depicts an example method for controlling a dual-independent hybrid actuator system, including the actuator system of FIG. 1.

DETAILED DESCRIPTION

A dual-independent hybrid actuator system and its method of operation are disclosed herein that enable independent control of a mechanical component, such as a flight control surface, by a hydraulic force provided by a hydraulic system and by a mechanical force provided by an electric motor. In a disclosed example, the actuator system incorporates the electric motor into the actuator body, and mechanically couples the electric motor to the hydraulic piston assembly via a threaded axle. The hydraulic piston assembly can be independently manipulated by the electric motor via the threaded axle and/or by the hydraulic system providing a hydraulic pressure differential to opposing sides of the hydraulic piston. In an example, an electrohydraulic servo valve (also referred to as an electro hydraulic servo actuator (EHSA)) of the hydraulic system can used for primary control of the actuator position, and the electric motor mechanically coupled to the hydraulic piston assembly can be used for alternate or additional control of the actuator position.

Figure 1:
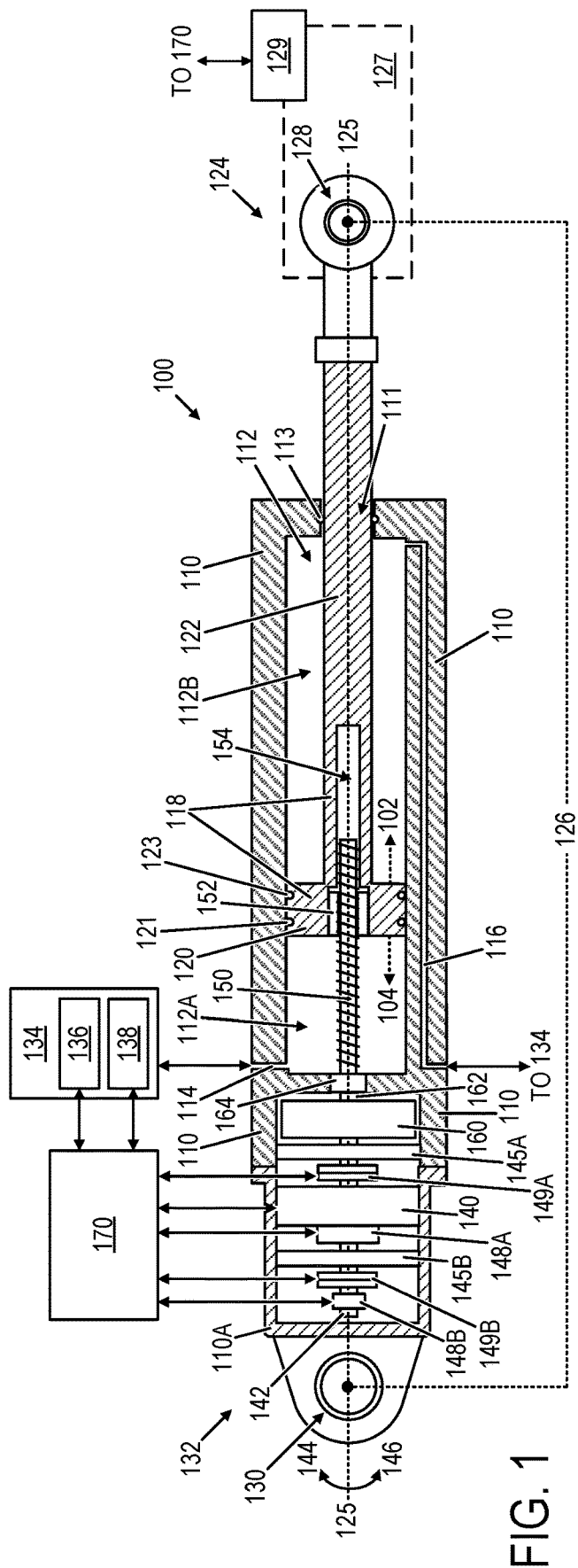
FIG. 1 depicts an example of a dual-independent hybrid actuator system according to the present disclosure.

FIG. 1 depicts an example of a dual-independent hybrid actuator system 100. Actuator system 100 includes an actuator body 110 defining a hydraulic chamber 112 within an interior of the actuator body. Within FIG. 1, aspects of actuator system 100 are shown in a section view to depict internal components contained within actuator body 100. Actuator body 110 further defines a first hydraulic fluid passage 114 and a second hydraulic fluid passage 116 that are in fluid communication with different regions of hydraulic chamber 112.

Actuator system 100 further includes a hydraulic piston assembly 118 that includes a hydraulic piston 120 disposed within hydraulic chamber 112. Hydraulic piston 120 divides hydraulic chamber 112 into a first hydraulic sub-chamber 112A that is in fluid communication with first hydraulic fluid passage 114, and a second hydraulic sub-chamber 112B that is in fluid communication with second hydraulic fluid passage 116. Hydraulic piston 120 can include one or more seals and/or bearings indicated schematically at 121 and 123 that interface with an interior surfaces of hydraulic chamber 112 to seal first hydraulic sub-chamber 112A from second hydraulic sub-chamber 112B and/or to reduce friction that opposes motion of the hydraulic piston relative to the actuator body.

Hydraulic piston assembly 118 further includes a piston rod 122 mounted to hydraulic piston 120. Piston rod 122 passes through second hydraulic sub-chamber 112B through an opening 111 formed in actuator body 110, and has a distal end 124 that projects outward from the actuator body. Actuator body 110 can include one or more seals and/or bearings indicated schematically at 113 that interface with piston rod 122 to seal second hydraulic sub-chamber 112B and/or to reduce friction opposing motion of the piston rod.

Actuator body 110 in combination with piston rod 122 forms a linkage 126 that includes a first bearing attachment point 128 at distal end 124 of piston rod 122, and a second bearing attachment point 130 at another distal end 132 of the actuator body opposite first bearing attachment point 128. As used herein, the term "actuator position" can refer to the length of linkage 126 formed between first bearing attachment point 128 of piston rod 122 and second bearing attachment point 130 of the actuator body. In an example, first bearing attachment point 128 can be mechanically coupled to a controlled mechanical component 127 (e.g., a flight control surface), depicted schematically in FIG. 1. Controlled mechanical component 127 may include or be associated with a positioning sensor 129 by which electronic control system 170 can measure and determine a position and/or orientation of mechanical component 127, enabling the electronic control system to move hydraulic piston assembly 118 to achieve a target position and/or orientation of mechanical component 127.

Actuator system 100 includes a hydraulic system 134 communicating with first hydraulic fluid passage 114 and second hydraulic fluid passage 116 of actuator body 110. Hydraulic system 134 is depicted schematically in FIG. 1 as including one or more hydraulic pumps 136, and one or more electrohydraulic servo valves 138. The one or more hydraulic pumps 136 can be selectively operated by an electronic control system 170 to generate hydraulic pressure within hydraulic system 134, and the one or more servo valves 138 can be selectively operated by the electronic control system to independently control the supply of hydraulic fluid to each of first hydraulic sub-chamber 112A via first hydraulic fluid passage 114 and second hydraulic sub-chamber 112B via second hydraulic fluid passage 116 to generate a target pressure differential between the first and second hydraulic sub-chambers. However, in at least some examples, one or more bi-directional hydraulic pumps (e.g., of pumps 136) or hydraulic motor of hydraulic system 134 can be used to control the hydraulic pressure differential between first and second hydraulic sub-chambers 112A and 112B.

According to an example operation of actuator system 100, a first pressure differential between first hydraulic sub-chamber 112A and second hydraulic sub-chamber 112B may be generated in which the first hydraulic sub-chamber has a higher hydraulic pressure than the second hydraulic sub-chamber to urge hydraulic piston 120 and piston rod 122 of hydraulic piston assembly 118 to move in a first translation direction 102 (i.e., the extending direction) along a translation axis 125, thereby increasing a length of linkage 126 between bearing attachment points 128 and 130. A second pressure differential between first hydraulic sub-chamber 112A and second hydraulic sub-chamber 112B can be generated by hydraulic system 134 in which the second hydraulic sub-chamber has a higher hydraulic pressure than the first hydraulic sub-chamber to urge hydraulic piston 120 and piston rod 122 of hydraulic piston assembly 118 to move in a second translation direction 104 (i.e., the retracting direction) opposite first translation direction 102 along translation axis 125, thereby decreasing a length of linkage 126 between attachment points 128 and 130.

Actuator system 100 further includes an electric motor 140 mounted to actuator body 110. In the example depicted in FIG. 1, electric motor 140 is housed in a separate sub-chamber of actuator body 110 that is partially defined by a cover portion 110A. Electric motor 140 includes a motor shaft 142 that rotates about an axis (e.g., 125) upon application of electrical power by electronic control system 170. Electric motor 140 can take the form of a DC motor or an AC motor, depending on implementation. Electronic control system 170 can selectively vary the electrical power and/or phase supplied to electric motor 140 to control a direction and rate of rotation of motor shaft 142.

Motor shaft 142 can be mounted on one or more axial bearings, examples of which are indicated schematically at 145A and 145B. Axial bearings can be provided in other suitable quantities and/or locations relative to motor shaft 142. Axial bearings 145A and 145B can take the form of thrust bearings that support loading of the motor shaft in axial or transverse directions (e.g., along axis 125).

Actuator system 100 further includes a threaded axle 150 mechanically coupled to motor shaft 142 of electric motor 140. In the example depicted in FIG. 1, threaded axle 150 passes through first hydraulic sub-chamber 112A and engages with a threaded port 152 formed in hydraulic piston assembly 118. As an example, hydraulic piston assembly 118 includes a ball screw nut (depicted at 310 in FIG. 3A) that defines threaded port 152, and threaded axle 150 forms a ball screw shaft (depicted at 312 in FIG. 3A).

In at least some examples, hydraulic piston assembly 118 defines an interior chamber 154 within hydraulic piston 120 and/or piston rod 122 that accommodates a portion of threaded axle 150 that projects through threaded port 152. In the example depicted in FIG. 1, threaded axle 150 is co-axial with piston rod 122 and a translation axis 125 of the piston rod. However, in other examples, threaded axle 150 can be parallel to, but not co-axial with either of piston rod 122 or translation axis 125. Also in the example depicted in FIG. 1, motor shaft 142 is co-axial with piston rod 122 and translation axis 125 of the piston rod. However, in other examples, motor shaft 142 can be orientated at an angle to piston rod 112 and translation axis 125, or motor shaft 142 can be parallel to, but not co-axial with either of piston rod 122 or translation axis 125. For example, motor shaft 142 can be mechanically coupled to threaded axle 150 via a drivetrain that enables motor shaft 142 to be offset from and/or angled relative to threaded axle 150.

Actuator system 100 may include a drivetrain 160 by which threaded axle 150 is mechanically coupled to motor shaft 142 of electric motor 140. In at least some examples, drivetrain 160 provides a non-parity (e.g., greater than or less than 1:1) effective gear ratio between motor shaft 142 and threaded axle 150. As an example, the non-parity effective gear ratio of drivetrain 160 provides a reduced rate of rotation of threaded axle 150 relative to a rate of rotation of motor shaft 142, thereby providing motor 140 with mechanical advantage that increases motor torque provided to threaded axle 150 and piston assembly 118. In an example depicted in FIG. 6, drivetrain 160 includes a planetary gear system. However, other suitable drivetrains may be used. FIG. 1 further depicts drivetrain 160 including an output shaft 162 and an axial bearing 164 by which threaded axle 150 is mounted or otherwise mechanically coupled to threaded axle 150. Axial bearing 164 can take the form of a thrust bearing that support loading of output shaft 162 in axial or transverse directions (e.g., along axis 125).

In at least some examples, electric motor 140 can take the form of a stepper motor that enables electronic control system 170 to measure and determine a rotational position and rate of rotation of motor shaft 142. Additionally or alternatively, one or more position sensors 148A, 148B, etc. can be included that enables electronic control system 170 to measure and determine a rotational position and rate of rotation of motor shaft 142. Position sensors can include a resolver mounted on motor shaft 142, output shaft 162, and/or threaded axle 150 to measure the rotation of motor shaft 142 and/or threaded axle 150. Position sensors can also include encoders and Hall effects sensors to determine a rotational position of the shaft, as an example. Position sensors can be used to detect backlash between threaded axle 150 and hydraulic piston 120, in at least some examples. Position sensors can be provided in other suitable quantities and/or locations relative to motor shaft 142, output shaft 162, and/or threaded axle 150. In at least some examples, actuator position can be determined by electronic control system 170 from sensor data received from positions sensors 148A and 148B, or electric motor 140 in the case of a stepper motor that reports its rotational position.

According to an example operation of actuator system 100, rotation of motor shaft 142 of electric motor 140 in a first rotation direction (e.g., 144 or 146) urges hydraulic piston 120 and piston rod 122 of hydraulic piston assembly 118 to move in first translation direction 102 to extend distal end 124 of piston rod 122 outward from actuator body 110, thereby increasing a length of linkage 126 between attachment points 128 and 130. Rotation of motor shaft 142 of electric motor 140 in a second rotation direction opposite the first rotation direction urges hydraulic piston 120 and piston rod 122 of hydraulic piston assembly 118 to move in second translation direction 104 opposite first translation direction 102 to retract distal end 124 of piston rod 122 inward toward actuator body 110, thereby decreasing a length of linkage 126 between attachment points 128 and 130.

Control system 170, during at least some operating conditions, can coordinate operation of electric motor 140 and operation of the one or more electrohydraulic servo valves 138 of hydraulic system 134. For example, control system 170 can increase hydraulic pressure in first hydraulic sub-chamber 112A relative to second hydraulic sub-chamber 112B to achieve the first pressure differential that urges piston rod 122 in first translation direction 102 while concurrently operating electric motor 140 to rotate in the first rotation direction, thereby increasing the length of linkage 126 between attachment points 128 and 130 through coordinated operation of both hydraulic system 134 and electric motor 140. During other operating conditions, electronic control system 170 can increase hydraulic pressure in second hydraulic sub-chamber 112B relative to first hydraulic sub-chamber 112A to achieve the second pressure differential while concurrently operating electric motor 140 to rotate in the second rotation direction opposite the first rotation direction, thereby reducing the length of linkage 126 between attachment points 128 and 130 through coordinated operation of both hydraulic system 134 and electric motor 140. Additional examples of coordinated operations between hydraulic system 134 and electric motor 140 are described in further detail with reference to FIGS. 4 and 5.

The possibility of back-driving electric motor 140 and drivetrain 160 may exist during conditions where there is a loss of hydraulic pressure and/or control of hydraulic system 134. Under these conditions, electric motor 140 in combination with threaded axle 150 can be used as the primary mode of control for hydraulic piston assembly 118. However, back-driving of electric motor 140 can occur if a force (e.g., aerodynamic loading) is applied to controlled mechanical component 127 that is greater than a static force resisting motion of hydraulic piston assembly 118. In at least some examples, electric motor 140, drive train 160, and/or threaded shaft 150 can be used with one or more electric brakes 149A, 149B, etc. that can be electrically actuated by electronic control system 170. Electric brakes 149A and 149B can be selectively engaged by electronic control system 170 to resist or prevent motion of hydraulic piston assembly 118 due to back-driving by a controlled mechanical component. Electric brakes can be provided in other suitable quantities and/or locations relative to motor shaft 142, output shaft 162, and/or threaded axle 150.

Figure 2A:
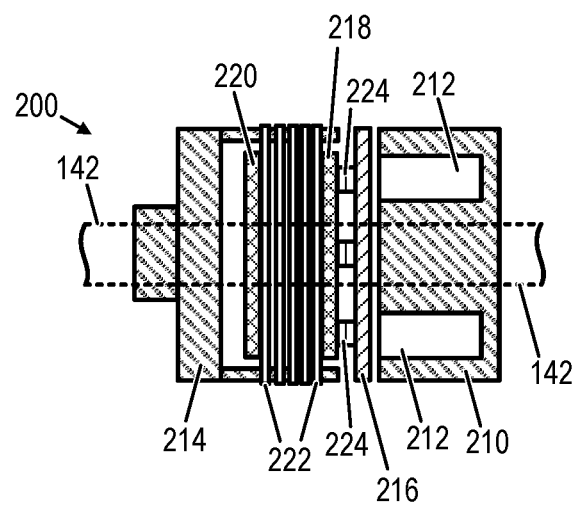
FIGS. 2A and 2B depict an example electric brake that can be used with the actuator system of FIG. 1.
Figure 2B:
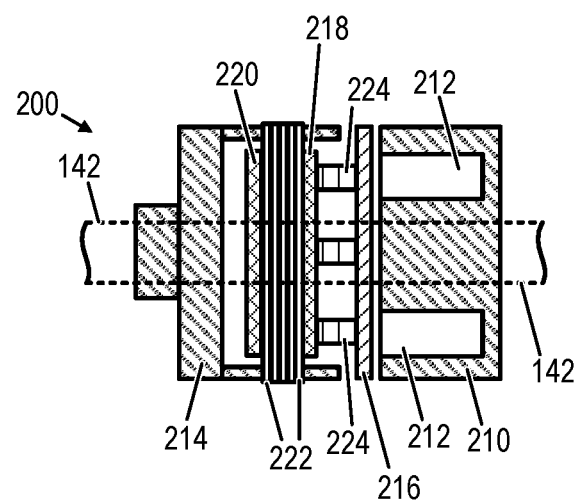

FIGS. 2A and 2B depict an example electric brake 200 that can be used with actuator system 100 of FIG. 1, such as for electric brakes 149A and 149B. Electric brake 200 includes a housing 210 that can be mounted to actuator body 110 of actuator system 100; a coil 212 to which electrical energy is applied; a drive cup 214 mounted to a shaft to which braking is to be provided, such as motor shaft 142); a buttress plate 216; an armature 218; an end plate 220; a set of friction discs 222 mounted between armature 218 and end plate 220; and springs 224 mounted between armature 218 and buttress plate 216. In an example, electric brake 200 is an electrically released brake that is engaged when electrical energy is absent from coil 212. When electrical energy is not supplied to coil 212, springs 224 exert a force on the set of friction discs 222 as depicted in FIG. 2B, thereby applying a brake force to rotation of the shaft and arresting torque in the shaft. In at least some examples, the brake is not disengaged until electricity is supplied to the coil. Under that condition, the coil generates a magnetic field which is used to pull the armature plate toward or against the springs, overcoming the spring force and allowing the friction discs to separate from each other. The discs are thereby allowed to spin freely without the ability to transmit or hold torque. FIG. 2A depicts an example where electrical energy is supplied to coil 222, which draws armature 218 (e.g., containing a magnet or magnetically attractive material such as a metal) toward buttress plate 216 and removes a braking force applied to the shaft. It will be appreciated that electric brake 200 is one example of an electric brake that can be used with actuator system 100, and that other electric brakes can be used, including electric brakes that impart a braking force to the shaft upon application of electrical energy to the brake.

Figure 3A:
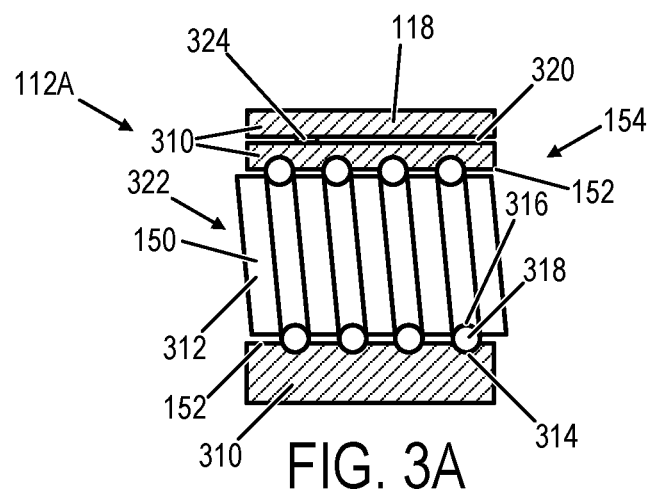
FIG. 3A depicts a detailed view of the actuator system of FIG. 1, including an example interface between a threaded axle and a threaded port.

FIG. 3A depicts a detailed view of actuator system 100 of FIG. 1, including an example interface between threaded axle 150 and threaded port 152. In an example, threaded port 152 is formed by a ball screw nut 310, and threaded axle 150 forms a ball screw shaft 312. In this example, ball screw nut 310 defines an exterior threaded race 314, and ball screw shaft 312 defines an interior threaded race 316. Threaded races 314 and 316 collectively contain ball bearings 318 that reduce rotational friction, and support radial and axial loading between ball screw nut 310 and ball screw shaft 312.

Furthermore, in the example depicted in FIG. 3A, hydraulic piston assembly 118 defines a fluid pathway 320 between interior chamber 154 and first hydraulic sub-chamber 112A that is independent of an opening 322 of threaded port 152 through which thread shaft 150 passes. Fluid pathway 320 forms a drain port that allows drainage of hydraulic fluid that leaks past ball bearings 318 into interior chamber 154. If hydraulic fluid is unable to drain from interior chamber 154, damage to piston rod 122 and/or hydraulic piston assembly 118 can occur. Accordingly, fluid pathway 320 can reduce or prevent damage caused by the build-up of hydraulic fluid in interior chamber 154

In FIG. 3A, fluid pathway 320 is formed in ball screw nut 310; however, fluid pathway may be alternatively or additionally formed in a body of hydraulic piston 120 and/or piston rod 122. Hydraulic piston assembly 118 further includes a one-way, in-line check valve 324 located along fluid pathway 320 that provides greater resistance to hydraulic fluid flowing along the fluid pathway through the in-line check valve toward interior chamber 154 as compared to hydraulic fluid flowing through the in-line check valve from the interior chamber toward first hydraulic sub-chamber 112A. Thus, as threaded axle 150 is rotated in a direction that increases its projection into interior chamber 154, hydraulic fluid can be displaced from interior chamber 154 and flow back into first hydraulic sub-chamber 112A via fluid pathway 320 and check valve 324.

Figure 3B:
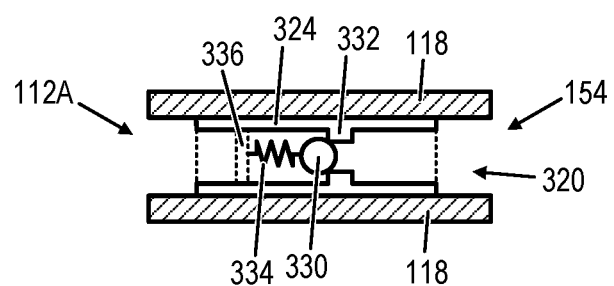
FIG. 3B depicts a detailed view of the actuator system of FIG. 1, including an example in-line check valve.

FIG. 3B depicts a detailed view of actuator system 100, including example check valve 324 located along fluid pathway 320 of hydraulic piston assembly 118 between interior chamber 154 and first hydraulic sub-chamber 112A. In this example, check valve 324 includes a valve core 330 that is urged against a valve seat 332 by a spring element 334 that is disposed between the valve core and a mounting bracket 336 or other feature of the valve. Hydraulic fluid of sufficient pressure within interior chamber 154 can overcome a spring force provided by spring element 334 that causes valve core 330 to be displaced from valve seat 332, thereby enabling the hydraulic fluid to flow through the valve into first hydraulic sub-chamber 112A via fluid pathway 320. It will be understood that other suitable types or configurations of one-way, in-line check valves may be used for check valve 324.

FIG. 4 is a flow diagram that depicts an example method 400 for controlling a dual-independent hybrid actuator system, including actuator system 100 of FIG. 1. Method 400 can be performed by electronic control system 170 of FIG. 1, as an example.

In at least some examples, method 400 may include calibrating the actuator system at 410. As an example of calibration, piston rod 122 may be extended and retracted across its operational range of motion, and sensor measurements may be captured and recorded by the electronic control system across the operational range of motion. For example, where electric motor 140 forms a stepper motor, rotational positioning data obtained across the operational range of motion of the piston rod can be mapped by the electronic control system, thereby enabling the electronic control system to later reference the mapped data to identify a current position of the piston rod (i.e., actuator position) at a given point in time. As another example, position sensors 148A and 148B of FIG. 1 enables the electronic control system to measure and determine a quantity of rotations of motor shaft 142, which can be mapped to the operational range of motion of the piston rod. Again, this initial calibration enables the electronic control system to later reference mapped data to identify a current position of the piston rod (i.e., actuator position) at a given point in time by observing a quantity of rotations of motor shaft 142 in either direction. Calibration with respect to other sensors may be performed at 410 across the operational range of the piston rod, including sensor 129 that measures a position and/or orientation of a controlled mechanical component. Positioning data captured by the electronic control system from sensor 129 may be mapped to data captured by other sensors, including position sensors 148A and 148B, and stepper motor positioning data.

At 412, the method includes receiving input data, which may include input from sensors (e.g., 129, 148A, 148B, a rotational position from electric motor 140 in the case of a stepper motor, etc.), a position reference (Position Ref) representing a control input for a mechanical component (e.g., flight control surface) that is to be controlled by the actuator system, and an indication of a selected operating mode (e.g., from a human operator or a computing system).

At 414, the method includes identifying a target change to a state of the actuator system based on the input data received at 412. As an example, the target change to the state of the actuator system includes a target magnitude (e.g., a distance) and a target translation direction (e.g., extending or retracting) representing a difference between a current actuator position and a target actuator position that is identified based on the input data received at 412. Identifying the target change to the state of actuator system may be further based on calibration data obtained at 410.

At 416, the method includes identifying an operating mode for the dual-independent hybrid actuator system based on the input data received at 412. As an example, the input data received at 412 may include a command that identifies an operating mode selected by a human operator or by a computing system (e.g., an on-board flight control computing system). As another example, the input data received at 412 may include data that indicates a failure condition, error condition, or normal operating condition (failure-free operation).

In at least some examples, the dual-independent hybrid actuator system can be operated in a selected one of a plurality of operating modes, including an active/active (A/A) mode, an active/no-load (A/NL) mode, an active/passive (A/P) mode, or a passive/active (P/A) mode, each of which is denoted by activity of the hydraulic system activity as compared to activity of the electric motor (i.e., hydraulic system activity/electric motor activity).

In the active/active mode, the hydraulic system and the electric motor are actively controlled to generate a combined force on the hydraulic piston assembly by both a hydraulic force imparted by the hydraulic system and a mechanical force imparted by the electric motor. The active/active mode may be selected to balance contribution of forces between the hydraulic system and the electric motor. For example, hydraulic pressure differentials that need to be generated across the hydraulic piston to impart a given total force can be reduced due to a contribution of mechanical force by the electric motor. The active/active mode may be used in cases where the hydraulic system is unable to generate sufficient hydraulic pressure or where operating at lower hydraulic pressure differentials is desirable. The active/active mode can provide higher dynamics than the active/passive mode.

In the active/no-load mode, the hydraulic system and the electric motor are actively controlled, but with the hydraulic piston assembly being operated by a hydraulic force imparted by the hydraulic system while the electric motor is operated to reduce, minimize, or eliminate a mechanical force imparted to the hydraulic piston assembly by the electric motor (and its drivetrain), including friction and drag. The active/no-load mode may be used where the electric motor serves as a back-up to the hydraulic system, while also reducing or minimizing hydraulic pressure differentials needed to overcome resistance from the electric motor (and its intermediate drivetrain). The active/no-load mode can provide higher dynamics than the active/passive mode. In at least some settings, the active/no-load mode consumes less power, reduces ball screw wear, and improves efficiency of the electro hydraulic servo actuator (EHSA) as compared to the active/active mode.

In the active/passive mode, the hydraulic system is actively controlled to impart a hydraulic force on the hydraulic piston assembly, and the electric motor and its drivetrain passively follow the movement of the hydraulic piston assembly. The active/passive mode may be used where the electric motor serves as a back-up to the hydraulic system, while also avoiding control overhead with respect to the electric motor.

In the passive/active mode, the electric motor is actively controlled to impart a mechanical force to the hydraulic piston assembly, and the hydraulic system is not operated or the hydraulic system is operated to reduce, minimize, or eliminate a hydraulic force that opposes the mechanical force of the electric motor. The passive/active mode may be used in cases where the hydraulic system is unable to generate sufficient hydraulic pressure, such as during a failure or partial failure of the hydraulic system.

At 418, the method includes operating the dual-independent hybrid actuator system in the operating mode identified at 416 to achieve the target change to the state of the actuator system identified at 418. As an example, the electronic control system controls the hydraulic system and/or the electric motor of the actuator system to move the hydraulic piston assembly to the target actuator position.

If the operating mode is identified at 416 as the active/active mode, the method at 420 includes controlling operation of one or more electrohydraulic servo valves of the hydraulic system to generate a target hydraulic pressure differential between opposing sides of the hydraulic piston that urges the piston rod in the target translation direction at 422. For example, in relation to actuator system 100 of FIG. 1, where the target translation direction is the extending direction 102, the hydraulic pressure differential includes a higher hydraulic pressure within first hydraulic sub-chamber 112A as compared to second hydraulic sub-chamber 112B. In another example, where the target translation direction is the retracting direction 104, the hydraulic pressure differential includes a higher hydraulic pressure within second hydraulic sub-chamber 112B as compared to first hydraulic sub-chamber 112A.

Concurrently and in coordination with the hydraulic force imparted by the hydraulic pressure differential at 422, the method at 424 includes controlling operation of the electric motor in a target rotation direction at 424 that urges the piston rod in the target translation direction. Controlling operation of the electric motor at 424 includes providing electrical power to the electric motor in sufficient quantity and phase to rotate the motor shaft in the target rotation direction to thereby rotate the threaded axle that engages with the hydraulic piston assembly. A total force urging the piston rod in the target translation direction includes the sum of the hydraulic force imparted by the hydraulic pressure differential and the mechanical force imparted by the electric motor to the hydraulic piston assembly. The total force imparted by the hydraulic force and the mechanical force may result in movement of the hydraulic piston assembly in the target translation direction where the total force exceeds a force opposing such movement, such as an air load on a flight control surface.

If the operating mode is identified as the active/no-load mode, the method at 430 includes controlling operation of one or more electrohydraulic servo valves of the hydraulic system to generate a target hydraulic pressure differential that urges the piston rod in the target translation direction at 432. Concurrently and in coordination with the hydraulic force imparted by the hydraulic pressure differential at 432, the method at 434 includes controlling operation of the electric motor to rotate the motor shaft in the target rotation direction corresponding to the target translation direction of the piston rod in a manner that reduces, minimizes, or eliminates resistance caused by the motor (and its intermediate drivetrain) to movement of the piston rod. Because the electric motor is not being used to impart a mechanical force to the hydraulic piston assembly in the active/no load mode, the hydraulic force is greater in the active/no-load mode than the active/active mode for a given total force imparted to the hydraulic piston assembly.

If the operating mode is identified as the active/passive mode, the method at 440 includes controlling operation of one or more electrohydraulic servo valves of the hydraulic system to generate a target hydraulic pressure differential that urges the piston rod in the target translation direction at 442, and the electric motor is not operated at 444 (i.e., the electric power is not supplied to the electric motor to induce an additional mechanical force on the hydraulic piston assembly). As the hydraulic piston assembly translates in the active/passive mode due to the hydraulic pressure differential, the electric motor (and its intermediate drivetrain) freely rotate, and resistance to such rotation is imparted to the hydraulic piston assembly.

If the operating mode is identified as the passive/active mode, the method at 450 includes controlling operation of the electric motor to rotate the motor shaft in the target rotation direction that urges the piston rod in the target translation direction at 454. At 452, the hydraulic system is not operated or an inhibiting pressure differential that urges the piston rod in a direction opposing the target translation direction is reduced, minimized, or eliminated by controlling operation of one or more electrohydraulic servo valves and/or pressure relief valves of the hydraulic system. For example, in relation to actuator system 100 of FIG. 1, where the target translation direction is the extending direction 102, hydraulic pressure within second hydraulic sub-chamber 112B may be reduced to thereby reduce the hydraulic force on the hydraulic piston assembly that opposes the mechanical force imparted by the electric motor. In another example, where the target translation direction is the retracting direction 104, hydraulic pressure within first hydraulic sub-chamber 112A may be reduced to thereby reduce the hydraulic force on the hydraulic piston assembly that opposes the mechanical force imparted by the electric motor.

From any of operating modes 420, 430, 440, and 450 performed as part of operation 418, the method returns to 412 where additional input data is received at a subsequent point in time. As an example, responsive to the hydraulic system being unable to generate a target hydraulic pressure differential between the opposing sides of the hydraulic piston as identified based on the additional input data received at 412, electrical power provided to the electric motor may be increased to rotate the motor shaft in a target rotation direction that urges the piston rod to move in the target translation direction to a target position, alone or in combination with a hydraulic pressure differential provided by the hydraulic system. The electric power provided to the electric motor may be increased as a result of a transition between modes, such as from the active/no-load mode or the active/passive mode to the active/active mode or the passive/active mode. Conversely, the electric power provided to the electric motor may be reduced as a result of a transition from the active/active mode or the passive/active mode to the active/no-load mode or the active/passive mode. Thus, during a first control operation (e.g., at a first point in time), one or more electrohydraulic servo valves of the hydraulic system can be operated to generate a target hydraulic pressure differential that urges the piston rod mounted to move in a target translation direction; and during a second control operation (e.g., at a second point in time), the electric motor can be operated to rotate the motor shaft in a target rotation direction that urges the piston rod to move in the first translation direction, with or without contribution of a hydraulic force from the hydraulic system.

Figure 5:
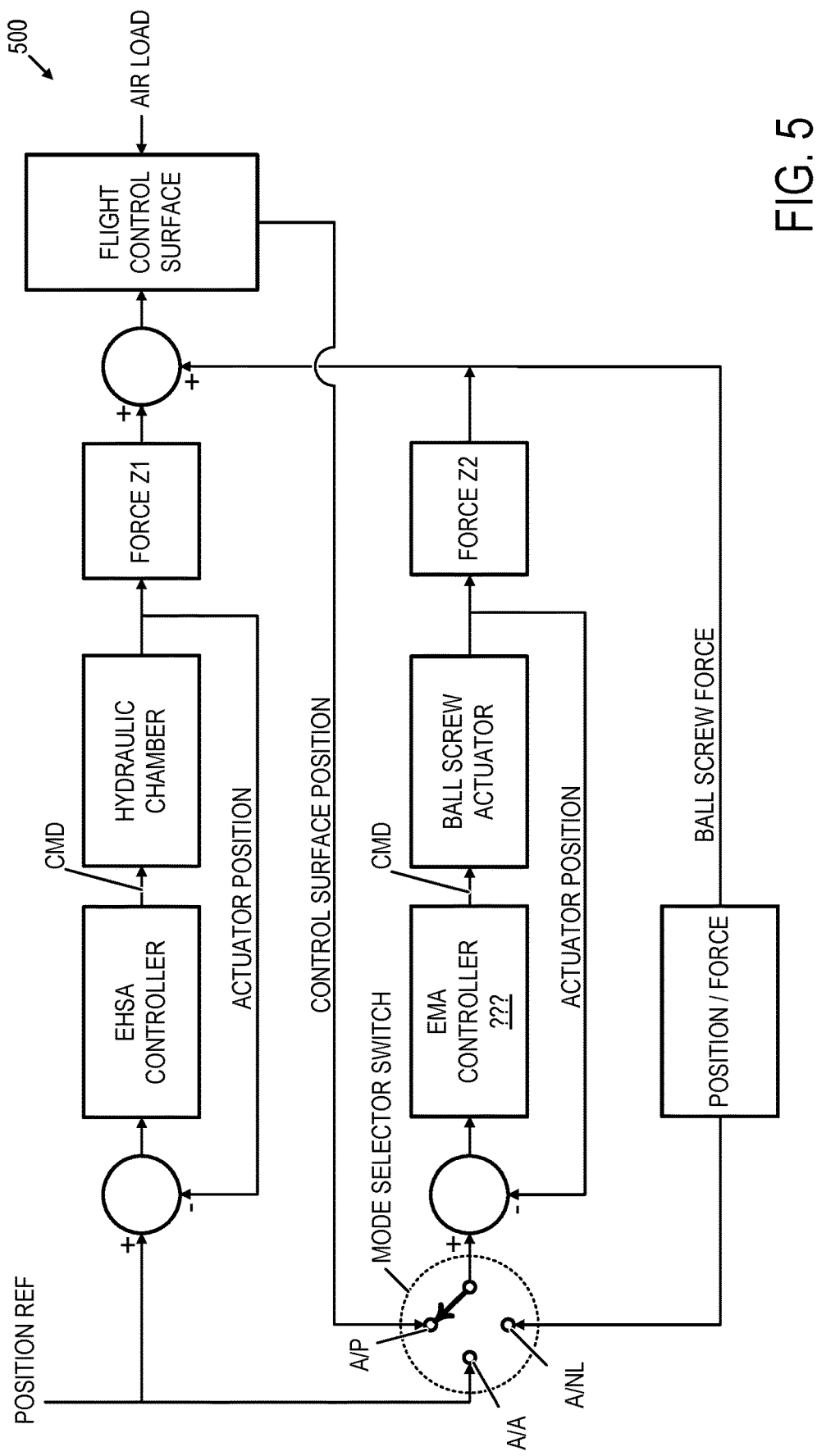
FIG. 5 schematically depicts an example control architecture for a dual-independent hybrid actuator system, including the actuator system of FIG. 1.

FIG. 5 schematically depicts an example control architecture 500 for a dual-independent hybrid actuator system, including actuator system 100 of FIG. 1. Control architecture 500 can be implemented by an electronic control system, such as electronic control system 170 of FIG. 1 to perform method 400 of FIG. 4 or portions thereof. In this example, control architecture 500 is described within the context of using dual-independent hybrid actuator system 100 of FIG. 1 with respect to a flight control surface as an example of a mechanical component that is controlled by the piston rod of the actuator system. For example, actuator position may be obtained from position sensors 148A and 148B, or the electric motor in the case of a stepper motor, and control surface position can be obtained from sensor 129 of FIG. 1. During a failure-free operation, position control of the control surface can be realized by a proportional position control loop of an electro hydraulic servo actuator (EHSA) controller, while load control can be realized by an additional proportional position load control loop for an electric motor driven ball screw (EMDLS) as an outer cascade to the position control loop. Within FIG. 5, the ball screw actuator is provided as an example of electric motor 140 of FIG. 1. In case of an EHSA failure or loss of hydraulic power, control can thus be switched to EMDLS position control. FIG. 5 further depicts an example of a mode selector switch that enables selection among the active/passive (A/P), the active/active (A/A), and the active/no-load (A/NL) operating modes previously described with reference to FIG. 4.

Figure 6:
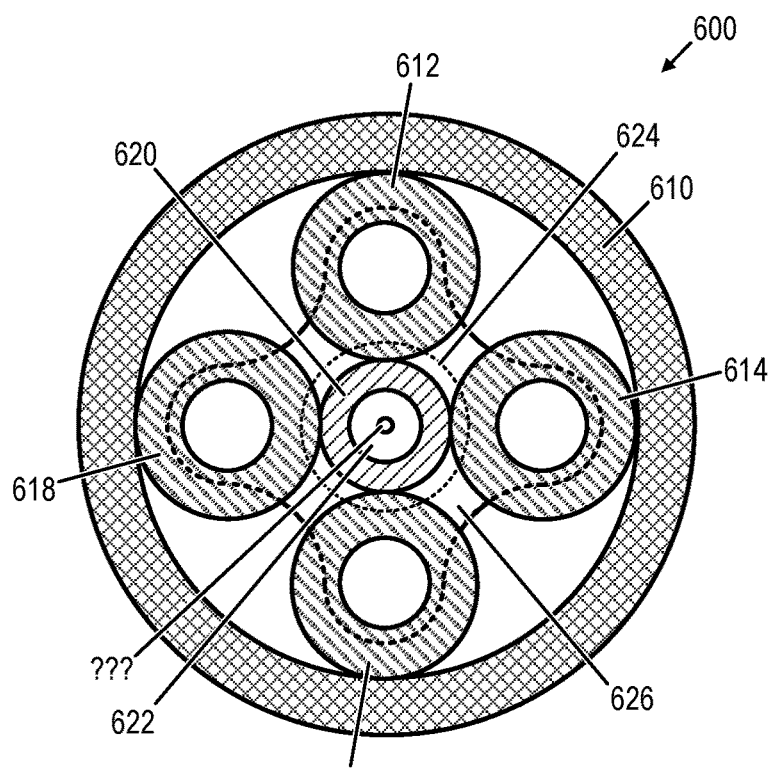
FIG. 6 depicts an example planetary gear system that may be included in a drivetrain of the actuator system of FIG. 1.

FIG. 6 depicts an example planetary gear system 600 that can be included in drivetrain 160 of actuator system 100 of FIG. 1. Planetary gear system 600 includes an exterior ring gear 610 that meshes with a plurality of planetary gears 612, 614, 616, 618, etc., which in turn mesh with a sun gar 620. It will be understood that fewer or greater quantities of planetary gears may be used, depending on implementation.

Within FIG. 6, gear teeth are omitted, as any suitable gear teeth configuration may be used to achieve a particular gear ratio for planetary gear system 600. In the context of actuator system 100, sun gear 620 is mounted upon a sun gear axle 622 having an axis of rotation that is co-axial with translation axis 125 of FIG. 1. The plurality of planetary gears are mounted to a carrier 626 having a carrier axle 624 that projects from an opposite side of planetary gear system 600 as sun gear axle 622. Carrier axle 624 can also be co-axial with translation axis 125. As an example, one of axles 622 or 624 can be mechanically coupled to motor shaft 142 of electric motor 140, and another of axles 622 or 624 can be mechanically coupled to threaded axle 150 to provide a desired gear ratio.

Figure 7:
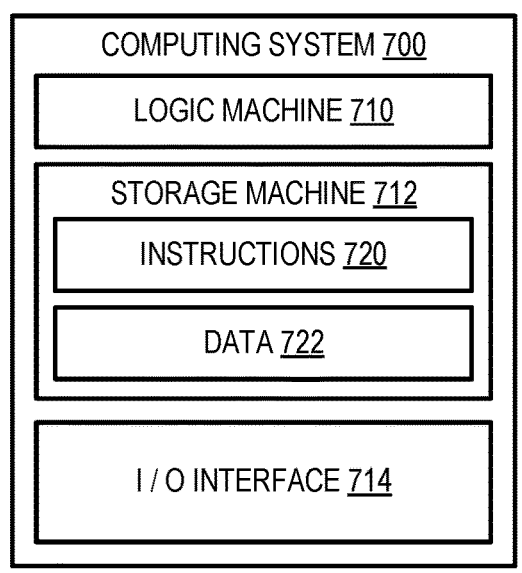
FIG. 7 depicts an example computing system that can implement the method of FIG. 4 and incorporate the control architecture of FIG. 5 for a dual-independent hybrid actuator system, including the actuator system of FIG. 1.

In at least some examples, the methods and processes described herein may be tied to a computing system of one or more computing devices. FIG. 7 depicts an example computing system 700 that can implement method 400 of FIG. 4 and control architecture 500 of FIG. 5 for a dual-independent hybrid actuator system, including actuator system 100 of FIG. 1. Computing system 700 is an example of an electronic control system for a dual-independent hybrid actuator system, such as electronic control system 170 of FIG. 1. Within FIG. 7, computing system 700 is shown in simplified form as including a logic machine 710, a storage machine 712, and an input/output subsystem 714.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 710 may include one or more processors configured to execute software instructions. Additionally or alternatively, logic machine 710 may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. For example, logic machine 710 may be implemented as a first logic machine component that controls operation of hydraulic system 134, and as a second logic machine component that controls operation of electric motor 140.

Storage machine 712 includes one or more physical devices configured to hold instructions 724 and/or other data 722 executable by logic machine 710 to implement the methods and operations described herein. When such methods and operations are implemented, the state of storage machine 712 may be transformed—e.g., to hold different data. Storage machine 712 may include one or more removable and/or built-in devices. Storage machine 712 may include optical memory (e.g., CD, DVD, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 712 may include volatile, nonvolatile, dynamic, static, read/write, read-only, random-access, sequential-access, location-addressable, file-addressable, and/or content-addressable devices. Individual components of the storage machine optionally may be distributed among two or more separate devices, which may be remotely located and/or configured for coordinated processing. For example, storage machine 712 may be implemented as a first storage machine component that holds instructions and/or data for controlling operation of hydraulic system 134, and as a second storage machine component that holds instructions and/or data for controlling operation of electric motor 140.

Aspects of logic machine 710 and storage machine 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Input/output subsystem 714 may comprise or interface with one or more input devices and/or output devices. Examples of input devices include the various sensors described herein (e.g., 129, 148A, 148B, electric motor 140 as a stepper motor that identifies rotational position, etc.), user input devices (e.g., cockpit controls in an aircraft, a computer mouse or controller, touch screen, natural language interface, etc.), communications interfaces (e.g., with another computing device), etc. Examples of output devices include electric motor 140, brake 149, hydraulic pumps 136, servo valves 138, pressure relief valves of the hydraulic system, user output interfaces (e.g., gauges, a graphical display device, an audio speaker, an indicator light), etc.

Examples of the subject matter of the present disclosure are described in the following enumerated paragraphs.

A.1 A dual-independent hybrid actuator system, comprises: an actuator body defining a hydraulic chamber within an interior of the actuator body, the actuator body further defining a first hydraulic fluid passage and a second hydraulic fluid passage in fluid communication with the hydraulic chamber; a hydraulic piston assembly, including: a hydraulic piston disposed within the hydraulic chamber and dividing the hydraulic chamber into a first hydraulic sub-chamber in fluid communication with the first hydraulic fluid passage and a second hydraulic sub-chamber in fluid communication with the second hydraulic fluid passage, and a piston rod mounted to the hydraulic piston and passing through the second hydraulic sub-chamber, the piston rod having a distal end that projects outward from the actuator body; an electric motor mounted to the actuator body, the electric motor having a motor shaft; and a threaded axle mechanically coupled to the motor shaft of the electric motor, the threaded axle passing through the first hydraulic sub-chamber and engaging with a threaded port formed in the hydraulic piston assembly.

A.2 The dual-independent hybrid actuator system of paragraph A.1, wherein rotation of the motor shaft of the electric motor in a first rotation direction urges the hydraulic piston to move in a first translation direction within the hydraulic chamber to extend the distal end of the piston rod outward from the actuator body; and wherein rotation of the motor shaft of the electric motor in a second rotation direction opposite the first rotation direction urges the hydraulic piston to move in a second translation direction within the hydraulic chamber opposite the first translation direction to retract the piston rod inward toward the actuator body.

A.3 The dual-independent hybrid actuator system of paragraph A.2, wherein a first pressure differential between the first hydraulic sub-chamber and the second hydraulic sub-chamber in which the first hydraulic sub-chamber has a higher hydraulic pressure than the second hydraulic sub-chamber urges the hydraulic piston to move in the first translation direction; and wherein a second pressure differential between the first hydraulic sub-chamber and the second hydraulic sub-chamber in which the second hydraulic sub-chamber has a higher hydraulic pressure than the first hydraulic sub-chamber urges the hydraulic piston to move in the second translation direction opposite the first translation direction.

A.4 The dual-independent hybrid actuator system of paragraph A.3, further comprising: a hydraulic system communicating with the first hydraulic fluid passage and the second hydraulic fluid passage of the actuator body; and a control system configured to coordinate operation of the electric motor and of an electrohydraulic servo valve of the hydraulic system to: increase hydraulic pressure in the first hydraulic sub-chamber relative to the second hydraulic sub-chamber to achieve the first pressure differential while concurrently operating the electric motor to rotate in the first rotation direction; and increase hydraulic pressure in the second hydraulic sub-chamber relative to the first hydraulic sub-chamber to achieve the second pressure differential while concurrently operating the electric motor to rotate in the second rotation direction.

A.5 The dual-independent hybrid actuator system of any of paragraphs A.1-A.4, wherein the threaded axle is co-axial with the piston rod or with a translation axis of the piston rod.

A.6 The dual-independent hybrid actuator system of paragraph A.5, wherein the motor shaft is co-axial with the piston rod or with the translation axis of the piston rod.

A.7 The dual-independent hybrid actuator system of any of paragraphs A.1-A.6, wherein the hydraulic piston assembly further includes a ball screw nut that defines the threaded port; and wherein the threaded axle forms a ball screw shaft.

A.8 The dual-independent hybrid actuator system of any of paragraphs A.1-A.7, wherein the hydraulic piston assembly defines an interior chamber within a body of the hydraulic piston and/or the piston rod that accommodates a portion of the threaded axle that projects through the threaded port; wherein the body of the hydraulic piston and/or piston rod defines a fluid pathway between the interior chamber and the first hydraulic sub-chamber that is independent of the threaded port; and wherein the hydraulic piston assembly further includes an in-line check valve located along the fluid pathway that provides greater resistance to hydraulic fluid flowing through the in-line check valve toward the interior chamber as compared to hydraulic fluid flowing through the in-line check valve from the interior chamber.

A.9 The dual-independent hybrid actuator system of any of paragraphs A.1-A.8, further comprising a drivetrain; wherein the threaded axle is mechanically coupled to the motor shaft of the electric motor via the drivetrain; and wherein the drivetrain provides a non-parity effective gear ratio between the motor shaft and the threaded axle.

A.10 The dual-independent hybrid actuator system of paragraph A.9, wherein the non-parity effective gear ratio provides a reduced rate of rotation of the threaded axle relative to a rate of rotation of the motor shaft.

A.11 The dual-independent hybrid actuator system of paragraph A.9, wherein the drivetrain includes a planetary gear system.

A.12 The dual-independent hybrid actuator system of any of paragraphs A.1-A.11, wherein the actuator body in combination with the piston rod forms a linkage that includes: a first bearing attachment point at the distal end of the piston rod, and a second bearing attachment point at a distal end of the actuator body opposite the first bearing attachment point.

B.1 A method of controlling a dual-independent hybrid actuator system, the method comprising: controlling operation of an electrohydraulic servo valve of a hydraulic system to generate a first hydraulic pressure differential between opposing sides of a hydraulic piston that urges a piston rod mounted to the hydraulic piston to move in a first translation direction; during movement of the piston rod in the first translation direction, controlling operation of an electric motor having a motor shaft mechanically coupled to the hydraulic piston via a threaded axle, wherein controlling operation of the electric motor includes providing electrical power to the electric motor to rotate the motor shaft in a first rotation direction that: urges the piston rod to move in the first translation direction in coordination with a force imparted by the first hydraulic pressure differential, or reduces resistance by the motor to movement of the piston rod in the first translation direction.

B.2 The method of paragraph B.1, further comprising: responsive to the hydraulic system being unable to generate the first hydraulic pressure differential between the opposing sides of the hydraulic piston, increasing the electrical power provided to the electric motor to rotate the motor shaft in the first rotation direction that urges the piston rod to move in the first translation direction to a target position.

B.3 The method of any of paragraphs B.1-B.2, further comprising: controlling operation of the electrohydraulic servo valve of a hydraulic system to generate a second hydraulic pressure differential between opposing sides of the hydraulic piston that urges the piston rod to move in a second translation direction opposite the first translation direction; during movement of the piston rod in the second translation direction, controlling operation of the electric motor by providing electrical power to the electric motor to rotate the motor shaft in a second rotation direction, opposite the first rotation direction, that: urges the piston rod to move in the second translation direction in coordination with a force imparted by the second hydraulic pressure differential, or reduces resistance by the motor to movement of the piston rod in the second translation direction.

B.4 The method of paragraph B.3, further comprising: responsive to the hydraulic system being unable to generate the second hydraulic pressure differential between the opposing sides of the hydraulic piston, increasing the electrical power provided to the electric motor to rotate the motor shaft in the second rotation direction that urges the piston rod to move in the second translation direction to a target position.

B.5 The method of any of paragraphs B.1-B.4, wherein controlling operation of the electric motor includes providing electrical power to the electric motor to rotate the motor shaft in a first rotation direction that eliminates resistance by the motor to movement of the piston rod in the first translation direction.

C.1 A method of controlling a dual-independent hybrid actuator system, the method comprising: during a first control operation, controlling operation of an electrohydraulic servo valve of a hydraulic system to generate a first hydraulic pressure differential between opposing sides of a hydraulic piston that urges a piston rod mounted to the hydraulic piston to move in a first translation direction; and during a second control operation, controlling operation of an electric motor having a motor shaft mechanically coupled to the hydraulic piston via a threaded axle to rotate the motor shaft in a first rotation direction that urges the piston rod to move in the first translation direction.

C.2 The method of paragraph C.1, wherein the second control operation is performed responsive to the hydraulic system being unable to generate the first hydraulic pressure differential between the opposing sides of the hydraulic piston during the first control operation.

C.3 The method of any of paragraphs C.1-C.2, wherein the second control operation is performed concurrently with the first control operation.

It will be understood that the configurations and/or techniques described herein are exemplary in nature, and that these specific examples are not to be considered in a limiting sense, because numerous variations are possible. The specific methods and operations described herein may represent one or more of any number of processing strategies. As such, various acts illustrated and/or described may be performed in the sequence illustrated and/or described, in other sequences, in parallel, or omitted. Likewise, the order of the above-described operations may be changed, depending on implementation. The subject matter of the present disclosure includes all novel and non-obvious combinations and sub-combinations of the various configurations and techniques, and other features, functions, acts, and/or properties disclosed herein, as well as any and all equivalents thereof.

The invention claimed is:

1. A dual-independent hybrid actuator system, comprising:
an actuator body defining a hydraulic chamber within an interior of the actuator body, the actuator body further defining a first hydraulic fluid passage and a second hydraulic fluid passage in fluid communication with the hydraulic chamber;
a hydraulic piston assembly, including:
a hydraulic piston disposed within the hydraulic chamber and dividing the hydraulic chamber into a first hydraulic sub-chamber in fluid communication with the first hydraulic fluid passage and a second hydraulic sub-chamber in fluid communication with the second hydraulic fluid passage, and
a piston rod mounted to the hydraulic piston and passing through the second hydraulic sub-chamber, the piston rod having a distal end that projects outward from the actuator body;
an electric motor mounted to the actuator body, the electric motor having a motor shaft;
a threaded axle mechanically coupled to the motor shaft of the electric motor, the threaded axle passing through the first hydraulic sub-chamber and engaging with a threaded port formed in the hydraulic piston assembly;
a hydraulic system communicating with the first hydraulic fluid passage and the second hydraulic fluid passage of the actuator body; and
a control system configured to coordinate operation of the electric motor and of an electrohydraulic servo valve of the hydraulic system to:
increase hydraulic pressure in the first hydraulic sub-chamber relative to the second hydraulic sub-chamber to achieve a first pressure differential while concurrently operating the electric motor to rotate in a first rotation direction, and
increase hydraulic pressure in the second hydraulic sub-chamber relative to the first hydraulic sub-chamber to achieve a second pressure differential while concurrently operating the electric motor to rotate in a second rotation direction.

2. The dual-independent hybrid actuator system of claim 1, wherein rotation of the motor shaft of the electric motor in the first rotation direction urges the hydraulic piston to move in a first translation direction within the hydraulic chamber to extend the distal end of the piston rod outward from the actuator body; and wherein rotation of the motor shaft of the electric motor in the second rotation direction opposite the first rotation direction urges the hydraulic piston to move in a second translation direction within the hydraulic chamber opposite the first translation direction to retract the piston rod inward toward the actuator body.

3. The dual-independent hybrid actuator system of claim 2, wherein the first pressure differential between the first hydraulic sub-chamber and the second hydraulic sub-chamber in which the first hydraulic sub-chamber has a higher hydraulic pressure than the second hydraulic sub-chamber urges the hydraulic piston to move in the first translation direction; and wherein the second pressure differential between the first hydraulic sub-chamber and the second hydraulic sub-chamber in which the second hydraulic sub-chamber has a higher hydraulic pressure than the first hydraulic sub-chamber urges the hydraulic piston to move in the second translation direction opposite the first translation direction.

4. The dual-independent hybrid actuator system of claim 1, wherein the threaded axle is co-axial with the piston rod or with a translation axis of the piston rod.

5. The dual-independent hybrid actuator system of claim 4, wherein the motor shaft is co-axial with the piston rod or with the translation axis of the piston rod.

6. The dual-independent hybrid actuator system of claim 1, wherein the hydraulic piston assembly further includes a ball screw nut that defines the threaded port; and wherein the threaded axle forms a ball screw shaft.

7. The dual-independent hybrid actuator system of claim 1, wherein the hydraulic piston assembly defines an interior chamber within a body of the hydraulic piston and/or the piston rod that accommodates a portion of the threaded axle that projects through the threaded port;

wherein the body of the hydraulic piston and/or piston rod defines a fluid pathway between the interior chamber and the first hydraulic sub-chamber that is independent of the threaded port; and wherein the hydraulic piston assembly further includes an in-line check valve located along the fluid pathway that provides greater resistance to hydraulic fluid flowing through the in-line check valve toward the interior chamber as compared to hydraulic fluid flowing through the in-line check valve from the interior chamber.

8. The dual-independent hybrid actuator system of claim 1, further comprising a drivetrain;

wherein the threaded axle is mechanically coupled to the motor shaft of the electric motor via the drivetrain; and wherein the drivetrain provides a non-parity effective gear ratio between the motor shaft and the threaded axle.

9. The dual-independent hybrid actuator system of claim 8, wherein the non-parity effective gear ratio provides a reduced rate of rotation of the threaded axle relative to a rate of rotation of the motor shaft.

10. The dual-independent hybrid actuator system of claim 8, wherein the drivetrain includes a planetary gear system.

11. The dual-independent hybrid actuator system of claim 1, wherein the actuator body in combination with the piston rod forms a linkage that includes:

a first bearing attachment point at the distal end of the piston rod, and a second bearing attachment point at a distal end of the actuator body opposite the first bearing attachment point.

12. A method of controlling a dual-independent hybrid actuator system, the method comprising:

controlling operation of an electrohydraulic servo valve of a hydraulic system to generate a first hydraulic pressure differential between opposing sides of a hydraulic piston that urges a piston rod mounted to the hydraulic piston to move in a first translation direction;

during movement of the piston rod in the first translation direction, controlling operation of an electric motor having a motor shaft mechanically coupled to the hydraulic piston via a threaded axle, wherein controlling operation of the electric motor includes providing electrical power to the electric motor to rotate the motor shaft in a first rotation direction that:

urges the piston rod to move in the first translation direction in coordination with a force imparted by the first hydraulic pressure differential, or reduces resistance by the motor to movement of the piston rod in the first translation direction.

13. The method of claim 12, further comprising:

responsive to the hydraulic system being unable to generate the first hydraulic pressure differential between the opposing sides of the hydraulic piston, increasing the electrical power provided to the electric motor to rotate the motor shaft in the first rotation direction that urges the piston rod to move in the first translation direction to a target position.

14. The method of claim 12, further comprising:

controlling operation of the electrohydraulic servo valve of a hydraulic system to generate a second hydraulic pressure differential between opposing sides of the hydraulic piston that urges the piston rod to move in a second translation direction opposite the first translation direction;

during movement of the piston rod in the second translation direction, controlling operation of the electric motor by providing electrical power to the electric motor to rotate the motor shaft in a second rotation direction, opposite the first rotation direction, that:

urges the piston rod to move in the second translation direction in coordination with a force imparted by the second hydraulic pressure differential, or reduces resistance by the motor to movement of the piston rod in the second translation direction.

15. The method of claim 14, further comprising:

responsive to the hydraulic system being unable to generate the second hydraulic pressure differential between the opposing sides of the hydraulic piston, increasing the electrical power provided to the electric motor to rotate the motor shaft in the second rotation direction that urges the piston rod to move in the second translation direction to a target position.

16. The method of claim 12, wherein controlling operation of the electric motor includes providing electrical power to the electric motor to rotate the motor shaft in a first rotation direction that eliminates resistance by the motor to movement of the piston rod in the first translation direction.

17. A dual-independent hybrid actuator system, comprising:

an actuator body defining a hydraulic chamber within an interior of the actuator body, the actuator body further defining a first hydraulic fluid passage and a second hydraulic fluid passage in fluid communication with the hydraulic chamber;

a hydraulic piston assembly, including:
- a hydraulic piston disposed within the hydraulic chamber and dividing the hydraulic chamber into a first hydraulic sub-chamber in fluid communication with the first hydraulic fluid passage and a second hydraulic sub-chamber in fluid communication with the second hydraulic fluid passage, and
- a piston rod mounted to the hydraulic piston and passing through the second hydraulic sub-chamber, the piston rod having a distal end that projects outward from the actuator body;

an electric motor mounted to the actuator body, the electric motor having a motor shaft; and a threaded axle mechanically coupled to the motor shaft of the electric motor, the threaded axle passing through the first hydraulic sub-chamber and engaging with a threaded port formed in the hydraulic piston assembly;

wherein the hydraulic piston assembly defines an interior chamber within a body of the hydraulic piston and/or the piston rod that accommodates a portion of the threaded axle that projects through the threaded port;

wherein the body of the hydraulic piston and/or piston rod defines a fluid pathway between the interior chamber and the first hydraulic sub-chamber that is independent of the threaded port; and wherein the hydraulic piston assembly further includes an in-line check valve located along the fluid pathway that provides greater resistance to hydraulic fluid flowing through the in-line check valve toward the interior chamber as compared to hydraulic fluid flowing through the in-line check valve from the interior chamber.

18. The dual-independent hybrid actuator system of claim 17, wherein rotation of the motor shaft of the electric motor in a first rotation direction urges the hydraulic piston to move in a first translation direction within the hydraulic chamber to extend the distal end of the piston rod outward from the actuator body; and wherein rotation of the motor shaft of the electric motor in a second rotation direction opposite the first rotation direction urges the hydraulic piston to move in a second translation direction within the hydraulic chamber opposite the first translation direction to retract the piston rod inward toward the actuator body.

19. The dual-independent hybrid actuator system of claim 18, wherein a first pressure differential between the first hydraulic sub-chamber and the second hydraulic sub-chamber in which the first hydraulic sub-chamber has a higher hydraulic pressure than the second hydraulic sub-chamber urges the hydraulic piston to move in the first translation direction; and wherein a second pressure differential between the first hydraulic sub-chamber and the second hydraulic sub-chamber in which the second hydraulic sub-chamber has a higher hydraulic pressure than the first hydraulic sub-chamber urges the hydraulic piston to move in the second translation direction opposite the first translation direction.

20. The dual-independent hybrid actuator system of claim 17, wherein the hydraulic piston assembly further includes a ball screw nut that defines the threaded port; and wherein the threaded axle forms a ball screw shaft.

* * * * *